United States Patent [19]

Luneau

[11] Patent Number: 4,659,953
[45] Date of Patent: Apr. 21, 1987

[54] MAGNETIC STRUCTURE FOR SYNCHRO AND TACHOMETER

[75] Inventor: John R. Luneau, Moultonborough, N.H.

[73] Assignee: Resolvex Corporation, Meredith, N.H.

[21] Appl. No.: 921,898

[22] Filed: Oct. 24, 1986

Related U.S. Application Data

[63] Continuation of Ser. No. 642,991, Aug. 21, 1984, abandoned.

[51] Int. Cl.⁴ .......................................... H02K 39/00
[52] U.S. Cl. ..................................... 310/111; 310/168; 310/155
[58] Field of Search .................. 310/168, 111, 44, 49, 310/155, 152

[56] References Cited

U.S. PATENT DOCUMENTS

| | | |
|---|---|---|
| 705,482 | 7/1902 | Thiermann . |
| 2,814,745 | 11/1957 | Sinclair, Jr. .......................... 310/155 |
| 2,917,699 | 12/1959 | Grant ............................... 310/111 X |
| 3,132,269 | 5/1964 | Craske ............................. 310/155 X |
| 3,293,469 | 12/1966 | Crawford .............................. 310/168 |
| 3,321,652 | 5/1967 | Opel ..................................... 310/168 |
| 3,389,281 | 6/1968 | Ellis ..................................... 310/168 |
| 3,458,741 | 7/1967 | Woodward ..................... 310/168 X |
| 3,872,334 | 3/1975 | Loubier ............................ 310/44 X |
| 3,956,649 | 5/1976 | Silverman ........................... 310/111 |
| 4,136,296 | 1/1979 | Hickey ............................. 310/155 X |
| 4,236,094 | 11/1980 | Raymond ........................ 310/111 X |
| 4,605,889 | 8/1986 | Luneau . |

Primary Examiner—Donovan F. Duggan
Attorney, Agent, or Firm—Body, Vickers & Daniels

[57] ABSTRACT

A magnetic structure including a stator including sensor windings and a field exciter, and a movable armature having a variety of applications, including a synchro resolver and a tachometer. The stator comprises a plurality of planes of oppositely polarized parallel magnetic pole pieces contained in an annular or toroidal structure of rectangular cross-section to circumferentially surround the movable rotor or armature. The parallel pole pieces of opposite polarity form a segment extending radially inward, and are surrounded by a plurality of sense windings, wherein the rotor selectively provides a relatively low reluctance path to one or more of the pole pieces, causing a change in flux and corresponding voltage to be produced in the sense windings. In one embodiment, the pole pieces are energized by a permanent magnet located in the stator to produce a tachometer output voltage upon the sense windings. In that configuration the sense winding signals vary in amplitude according to velocity and position. Alternately, the pole pieces are energized by an electromagnet at an excitation frequency, producing corresponding sense winding signals at the excitation frequency. In this case, the sense winding signals vary in amplitude and phase according to the rotor position relative to the stator. The sense winding signals for the tachometer or synchro resolver are connected to appropriate commutation and signal detection circuits to provide the desired tachometer or synchronous resolver output signals.

11 Claims, 9 Drawing Figures

DEMODULATED RESOLVER OUTPUT

TACHOMETER

MAGNETIC STRUCTURE FOR SYNCHRO AND TACHOMETER

This is a continuation of Ser. No. 642,991, filed Aug. 21, 1984, now abandoned.

FIELD OF THE INVENTION

The present invention relates to electromagnetic position and velocity sensors, and in particular to magnetic circuits for tachometers and synchronous resolvers.

BACKGROUND OF THE INVENTION

Presently available resolvers include exciter windings on the rotor of the resolver and additional output windings on the stator of the resolver. The rotor windings are excited with an AC field of a fixed amplitude to induce voltages in the output windings on the stator, having substantially a sinewave function of the rotor position relative to that stator. The output winding configuration may have any number of phases, the most common being two or three phases. In order to provide the excitation field, the rotor must be excited by a winding, and therefore receive electrical excitation currents throughout the rotation of such resolver. The most common technique to transfer the energy signal or excitation current is via mechanical slip rings, or additional ancillary rotary transformers.

Similarly, in most tachometer generators, signals and/or currents must also be transferred from a rotating winding to the external circuitry. Typically, the tachometers include stationary permanent magnets for field excitation and rotating armature windings with mechanical commutators upon which brushes ride for transferring the DC voltage from the rotor to the stator. Alternately, the exciting magnets may be part of the rotor, wherein poly-phase windings are uniformly distributed around the stator in a manner so as to be linked with the permanent magnet flux path through the rotor throughout the rotation of the tachometer. Such brushless DC tachometer generators require the use of additional electronic commutator circuitry, to provide the processing of the polyphase winding signals in order to drive accurate position information. A device typically used for commutation of tachometers in a Hall-effect sensor, wherein a three-phase tachometer would then require the use of three Hall-effect sensors, mounted so as to sense the location of the permanent magnet poles relative to the stator windings. However, the use of Hall-effect devices limits the temperature environments in which these tachometers may be used.

Moreover, the output waveform generated by commutated polyphase brushless tachometers with rotating magnet structures do not exhibit the desired constant voltage-velocity relationship. The non-constant relation of the polyphase output voltages relative to the rotor rotation therein includes some distortion or "ripple" caused by rotating leakage patterns from the magnets. Thus as the phases are switched according to the commutation action, typically every 60 or 90 electrical degrees, an output voltage produced contains substantial variation or ripple voltage, generally highly undesirable.

SUMMARY OF THE INVENTION

The apparatus of the present invention comprises a magnetic structure, including an annular stator of rectangular cross-section having a fixed and nonrotating leakage path and a highly permeable rotor of a particular geometry. The stator includes a plurality of pole pieces, excitation coils, and sense windings, which in combination with the rotor produce a particular sense winding output signal relative to the sensor armature position. For example, one embodiment of the present invention includes a tachometer having substantially reduced ripple voltage. Furthermore, according to the present invention, the location of the field excitation and the sense coils in the stationary stator assembly permits a passive rotor of the magnetic material to be used. The rotor selectively provides a low reluctance path to at least one of the magnetic pole pieces having a first polarity and a high reluctance path to at least one pole piece having a second polarity, and alternately providing a low reluctance path to at least one of the magnetic pole pieces having the second polarity and a high reluctance path to at least one pole piece having the first polarity according to the position of the armature means, so that the sensor windings are disposed to include the high reluctance path and the low reluctance path, producing a signal according to the relative position of the rotor. In this manner, the particular embodiment of the magnetic structure according to the present invention, such as a tachometer or a synchronous resolver, provides output signals of a desired wave shape, without the necessity of providing an electrically energized or magnetized moving armature, providing a more reliabile device. Moreover, structures according to the present invention exhibit lower errors for a given output signal, as well as a lower material and assembly cost.

BRIEF DESCRIPTION OF THE DRAWING

These and other features of the present invention will be better understood by reading the following detailed description of the present invention, together with the drawing, wherein.

DETAILED DESCRIPTION OF THE INVENTION

Figure 1:
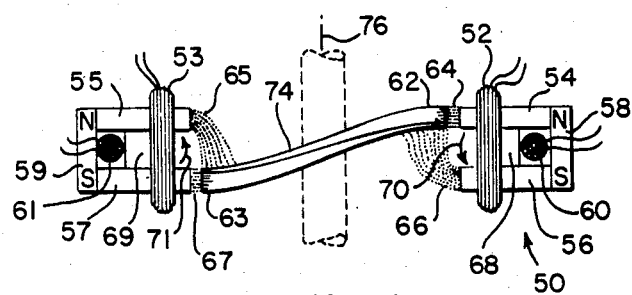
FIG. 1 is a functional drawing of the magnetic structure according to the present invention in cross-section.

The general magnetic structure 50 according to the present invention is shown in FIG. 1. A magnetic sense coil 52 includes a first pole piece 54 and a second pole piece 56, which is magnetically excited by an optional permanent magnet 58 or an electromagnet 60. The pole piece elements 54 and 56 are excited to produce opposite magnetic flux flowing through each pole piece.

Each pole piece 54 and 56 selectively, and in this case, alternately, communicates with an armature 62, which forms either a low reluctance path, such as at 64 where the armature 62 is in close proximity with one end of pole piece 54, or a high reluctance path such as at 66, where the armature 62 is spaced apart from the pole piece 56 having a longer air gap therebetween. By alternately communicating with pole piece 54 and pole piece 56, the armature can be used to change the flux through the sense coil 52, which therefore produces a corresponding output voltage. The magnetic assembly can therefore produce a reversal of magnetic field through the sensing coil 52 without physical movement of the sensing coil 52, magnetic pole pieces 54 and 56, or exciting elements such as magnet 58 or electromagnet 60.

Of special note is the location and effect of leakage paths, exemplified by flux paths 70 and 71. For all applications, the flux path, existing between oppositely energized magnetic pole pieces 54 and 56 are contained entirely within the sensing coil 52, and as such, are independent and isolated from the position in movement of the armature 62. As a result, the leakage path 70 is relatively insensitive to influence (as measured by the signal generated by the sensing coil 52) from the movement of the armature 62. Therefore, for any desired signal, wave form the shape or edge profile of the armature 62 can be more rapidly and directly determined without extensive correction for pertubation of leakage paths.

Typically the magnetic structure according to the present invention comprises a symmetrically balanced set of elements, which further include a second sense coil 53 which correspondingly includes a second set of magnetic pole pieces 55 and 57, energized by either a permanent magnet 59 or an electromagnet 61 to provide opposite magnetic energization of the pole pieces 55 and 57. As discussed above, each pole piece 55, 57 communicates with an armature 63, alternately through a low reluctance magnetic path 67 and a high reluctance path 65, shown here with pole pieces 57 and 55, respectively.

Typically, according to the present invention, the pole pieces of one polarity, 54 and 55, as well as pole pieces 56 and 57, are each elements of an annular or toroidal magnetic structure of rectangular cross-section, existing in a plane parallel to the plane of the torus having inward directed radial pole pieces, which are included by sense coils 52 and 53. The pole pieces 54 and 55 are typically part of the same laminated planar subsections, as is the structure plane forming pole pieces 56 and 57. The two groups of laminated pole pieces are spaced apart by nonmagnetic material 68 and 69 to receive the exciting electromagnetic winding 60 and 61, as well as to provide a leakage path 70 and 71 of sufficiently high reluctance to be negligable with respect to the selectable reluctance paths, such as at 64 and 67. Moreover, the magnet assemblies 58 and 59 are part of the same magnetic structure formed as a rectangular cross-section torus enclosing the pole pieces 54,55,56, and 57.

In the event the axis of the armature moves laterally, the sense windings 52 and 53 are additively conected in series such that as the path at 67 becomes shorter, the change is offset by an increase in path length at 64, wherein signal errors from the windings 52 and 53 would be substantially cancelled. According to the present invention, the armature 74 including end portions 62 and 63 alternately couple field 73 from pole pieces 54 and 57, or pole pieces 55 and 56, causing a changing field through sense windings 52 and 53.

If the signals to be generated are a measure of rotational parameters, such as for a resolver or tachometer, the armature 74 is connected by a bushing 74 to a pivotable shaft 76 connected to the equipment (not shown) whose position and/or velocity is to be monitored. Alternatively, if a particular wave shape of signals is to be generated, a different variation in magnetic field is produced by selecting a rotor profile which will provide the required flux distribution. For the tach output it is a direct function, and for the resolver it is the integral. Thus, these two signals are always 90° electrical out of phase.

Figure 2A:
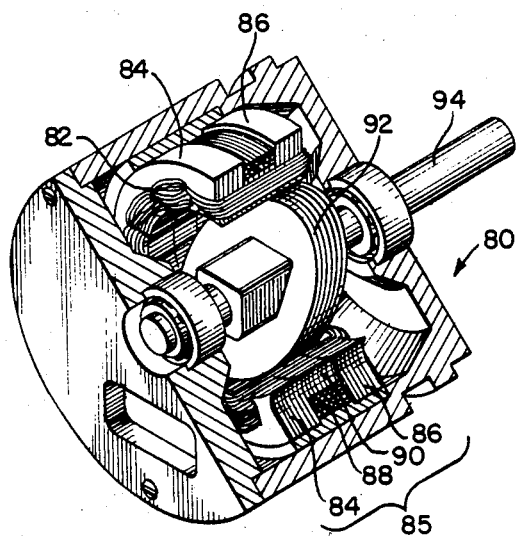
FIG. 2A is a perspective view, partially in section, of a resolver according to the present invention.
Figure 2B:
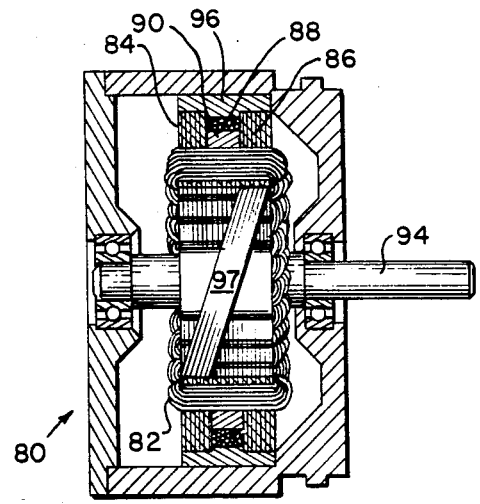
FIG. 2B is a cross-section view of the resolver according to the present invention.

A resolver 80 including the apparatus according to the present invention is shown in FIG. 2A and in cross-section in FIG. 2B. Polyphase sense windings 82 receive the oppositely energized pole pieces 84 and 86, each having radially inward extending elements. The pole elements 84 and 86 are energized by a winding 88 surrounding a nonmagnetic material 90 between each toroidal pole piece 84 and 86. The path between the pole pieces 84 and 86 is selectively confronted by the edge surface 97 of a rotor element 92 mounted on a shaft 94 and rotatable thereupon in relation to the connected external equipment. An additional magnetic material 96 substantially surrounds the pole pieces 84 and 86 to provide a higher permeability magnetic return path or itself provide a permanent magnet field.

According to this first embodiment, a rotor 92 design shown produces a quadrature pair of sinusoidal signals at each sense winding 114 and 116 of FIG. 3, discussed below. The rotor 92 comprises a planar section of magnetic material obliquely retained and rotated on shaft 94. The rotor 92 surface 97 is cylindrically ground to uniformly confront pole pieces 82 and 86, having a constant width equal to the width of either pole piece 82 or 86 and the nonmagnetic material 88, thereby providing a sinusoidally distribted surface area at this interface.

Figure 3:
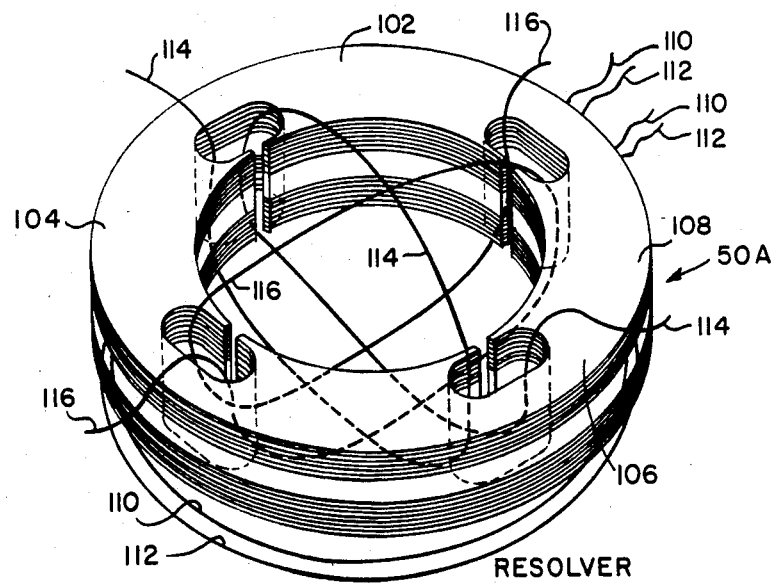
FIG. 3 is a schematic drawing showing the magnetic stator assembly of the present invention in perspective.
Figure 4:
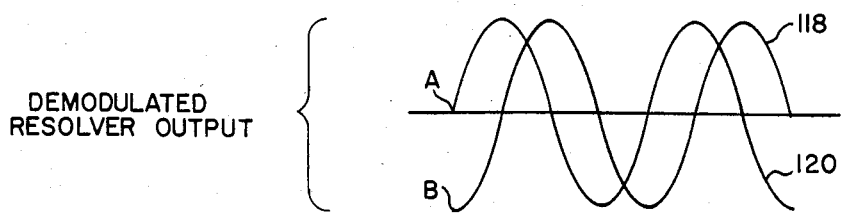
FIG. 4 is a waveform plot of the demodulated resolver output signals according to the present invention.

A simplified winding diagram is shown in FIG. 3, wherein the magnetic assembly 50A includes four stator segments 102, 104, 106, and 108. As discussed above, each stator segment includes two pole pieces and a nonmagnetic spacing material in planar assembly. Two energization windings 110 and 112 are shown, and reside as element 88 as shown in FIGS. 2A and 2B, discussed above. The excitation windings 110 and 112 comprise two windings which are driven in push-pull as shown, or may comprise a single winding energized with signal currents of alternating magnitudes. Similarly, the sense winding 114 or the orthogonal sense winding 116 may comprise a plurality of windings, which are not shown separately for the sake of simplicity. The sense winding 114 is wound such that the induced voltages add as the section 102 and 108 are energized to a first polarity and sections 104 and 106 are energized to the opposite magnetic polarity. Similarly, winding 116 is wound to have additive electrical voltages when sense windings 102 and 104 are energized to a first magnetic polarity and sections 106 and 108 are energized to the opposite magnetic polarity. The exciting windings 110 and 112, as well as the sense windings 114 and 116, are connected to resolver systems, such as the tracking synchro and resolver to digital converter, shown in FIGS. 3-2, page 45, of the publication, *Synchro & Resolver Conversion Produced by Analog Devices*, published by Memory Devices Ltd., Central Avenue East Molesey, Surrey, England, and with other synchro signal modules known in the art which received the quadrature sinusoidal voltages 118 and 120, produced by the system and shown in graphic form in FIG. 4.

Figure 5A:
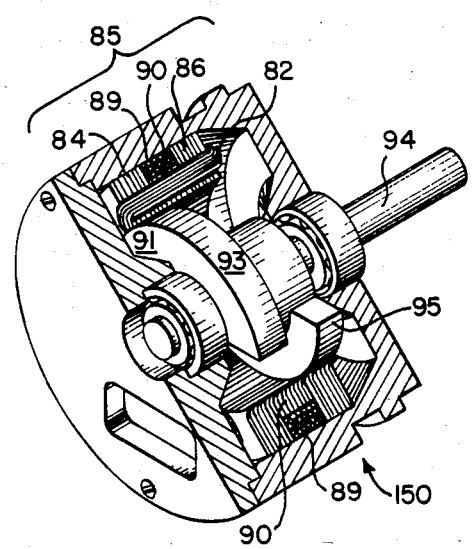
FIG. 5A is a perspective view, partially in section of the tachometer according to the present invention.
Figure 5B:
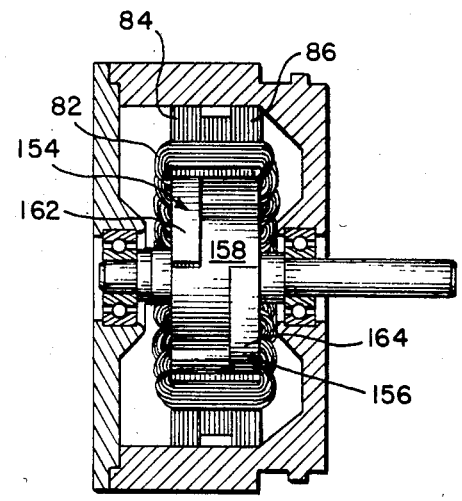
FIG. 5B is a cross-sectional view of the tachometer according to the present invention.

A tachometer 150, shown in FIG. 5A and in cross-section in FIG. 5B, employs an alternate embodiment of the rotor 91 and the stator 85 in combination, according to the present invention. A plurality of sensor windings 82 are shown, which enclose a plurality of alternately excited pole pieces 84 and 86, being excited by a permanent magnet 89 interposed between the pole pieces 84 and 86, for opposite magnetic energization thereof. As discussed above, a nonmagnetic space material 90 is included between the pole pieces 84 and 86. A rotor 91 is retained by and axially rotatable about shaft 94. The rotor 91 induces sharp field transitions between the respective magnetic pole elements 84 and 86 throughout the armature, according to the rotation of the shaft 94, as discussed below.

In particular, the rotor 91 comprises discrete segments 154 and 156 forming a rotor having interrupted surfaces 162 and 164 coupled by a magnetic center section 158, wherein as the radially outward surfaces 162 and 164 traverse the pole pieces 84 and 86, causing the above-mentioned sharp field transition according to the shaft 94 rotation, wherein the field polarity through sensor coils 82 is accordingly changed.

Figure 6:
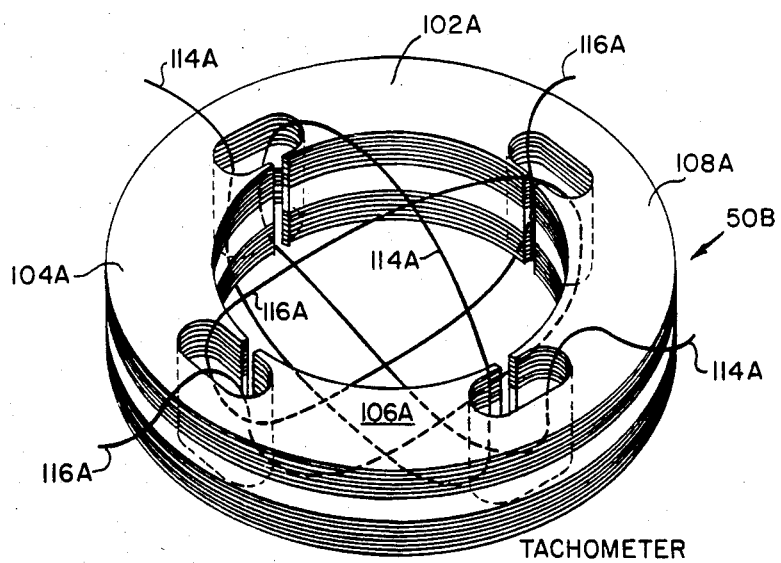
FIG. 6 is a schematic drawing of the tachometer winding, showing the stator magnetic assembly in perspective.

The magnetic structure 50 is shown in FIG. 6, being adapted for the tachometer configuration. The structure 50B comprises a plurality of segments 102A, 104A, 106A, and 108A, and retains orthogonal sense windings 114A and 116A. The winding 114A is wound to provide additive voltages when the segments 102A and 102B are energized to a field of one polarity, and segments 104A and 106A are energized to the opposite polarity. Similarly, sensor winding 116A is wound to produce additive voltages when segments 102A and 104A are energized to a first polarity flux, and segment 106A and 108A are energized to the opposite polarity. Moreover, the windings 114A and 116A typically each comprise a pair of windings connected to provide equal and opposite induced signals to the associated tachometer commutation circuitry (not shown).

Figure 7:
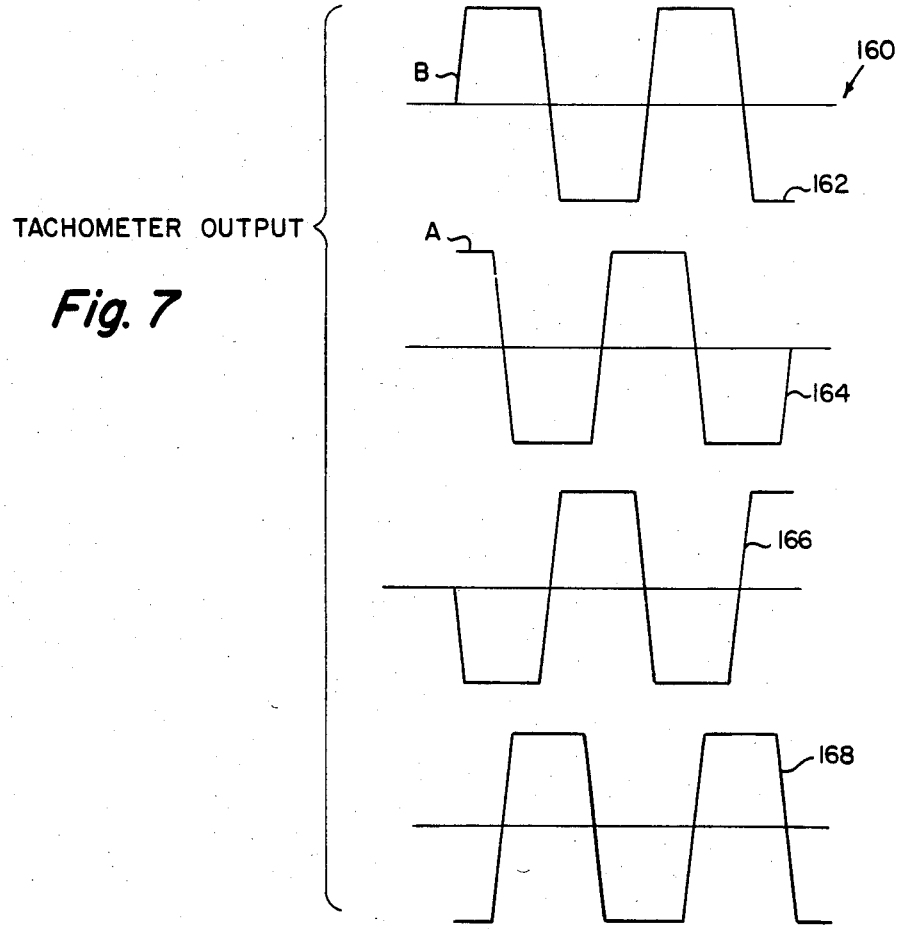
FIG. 7 is a family of waveforms of the tachometer sense winding output signals according to the present invention.

The sense winding signals produced are shown as a family of curves 160 in FIG. 7, wherein the four phases 162, 164, 166, and 168 correspond to the signals produced by sensor windings 114A and 116A. The signals are received and demodulated by commutation circuits generally used with winding pairs.

Other embodiments, including modifications and substitutions of the above disclosed structure elements made by one skilled in the art, are considered within the scope of the present invention, which is not to be limited, except by the claims which follow.

What is claimed is:

1. A magnetic transducer comprising:
   an annular magnet having two axially disposed, concentric pole pieces of opposite polarity, each said magnetic pole piece including a plurality of magnetically coupled, radially inwardly directed pole sections having the same magnetic polarity;
   rotor means having a continuous magnetic structure aligned to confront said radially directed pole sections for selectively completing the magnetic path between one of said axially disposed poles of one polarity and an angularly displaced one of said axially disposed poles of the opposite polarity according to the angular position of said rotor with respect to said annular magnet;
   a first sensor coil disposed about at least one said magnetic pole section of each polarity and including both of said pole pieces, wherein only the pole sections of one magnetic polarity of the pole pieces within said first sensor coil is included in the magnetic path selectively completed by said rotor; and
   a second sensor coil electrically connected to said first sensor coil and disposed about at least one said magnetic pole section of each polarity and including both of said pole pieces, wherein only the pole section of one magnetic polarity of the pole pieces within said second sensor coil is included in the magnetic path selectively completed by said rotor, and wherein
   the polarity of the pole section completing the magnetic path in the pole sections about which said first sensor coil is disposed is opposite to the polarity of the magnetic pole section completing the magnetic path in the pole section about which said second sensor coil is disposed.

2. A control signal generating device comprising an housing: a drive shaft rotatable in said housing about a given axis whereby the rotation of said shaft with respect to said housing generates at least one control signal; first and second ring-shaped pole pieces having generally cylindrical, inwardly facing first and second pole surfaces, respectively; means for mounting in said housing said ring-shaped pole pieces in spaced relationship with said surfaces concentric with said shaft axis; a magnetically permeable rotor supported on said shaft and rotatably mounted on said axis; said spaced ring-shaped pole pieces being divided into at least two circumferentially spaced pole sections having an angular spacing; said rotor having an outwardly facing, circumferentially extending, flux concentrating surface generally concentric with said axis, said flux concentrating surface having a first segment generally aligned radially with said first pole surface and a second segment generally aligned axially with said second spaced pole surface; said segments spaced circumferentially a distance correlated with said angular spacing of said pole sections of said ring-shaped pole pieces; means for magnetizing said pole pieces with opposite polarities at said pole surfaces; and sensing coil means associated with at least the pole pieces at one of said pole sections for generating said control signal as said shaft is rotated.

3. A control signal device as defined in claim 3 wherein said magnetizing means is a permanent magnet concentric with said axis and between said ring-shaped pole pieces.

4. A control signal device as defined in claim 3 wherein said magnetizing means is a D.C. exciting coil concentric with said axis and between said ring-shaped pole pieces.

5. A control signal device as defined in claim 3 wherein said magnetizing means is an A.C. exciting coil concentric with said axis and between said ring-shaped pole pieces.

6. A control signal device as defined in claim 5 wherein said magnetizing means is a permanent magnet concentric with said axis and between said ring-shaped pole pieces.

7. A control signal device as defined in claim 5 wherein said magnetizing means is a D.C. exciting coil concentric with said axis and between said ring-shaped pole pieces.

8. A control signal device as defined in claim 5 wherein said flux concentrating surface is an obliquely oriented generally concentric continuous element.

9. A control signal device as defined in claim 3 wherein said flux concentrating surface is an obliquely oriented generally concentric continuous element.

10. A control signal device as defined in claim 5 wherein said flux concentrating surface first segment is generally arcuate and extends over at least a circumferential distance equal to the angular spacing of adjacent ones of said pole pieces.

11. A control signal device as defined in claim 3 wherein said flux concentrating surface first segment is generally arcuate and extends over at least a circumferential distance equal to the angular spacing of adjacent ones of said pole pieces.

* * * * *

UNITED STATES PATENT AND TRADEMARK OFFICE
CERTIFICATE OF CORRECTION

PATENT NO. : 4,659,953
DATED : April 21, 1987
INVENTOR(S) : John R. Luneau

It is certified that error appears in the above-identified patent and that said Letters Patent are hereby corrected as shown below:

Column 1, line 14, "exicter" should read --- exciter ---; line 45, "in" should read --- is ---. Column 2, line 49, after "section" insert a comma (,). Column 3, line 28, "pertubation" should read --- perturbations ---. Column 4, lines 36 and 37, "82" should read --- 84 ---; line 39, "distribted" should read --- distributed ---. Column 6, lines 49, 53 and 57, "claim 3" should read --- claim 2 ---. Column 7, line 4, "claim 3" should read --- claim 2 ---. Column 8, line 3, "claim 3" should read --- claim 2 ---.

Signed and Sealed this

Twenty-seventh Day of February, 1990

Attest:

JEFFREY M. SAMUELS

*Attesting Officer*     *Acting Commissioner of Patents and Trademarks*